United States Patent Office 2,912,352
Patented Nov. 10, 1959

2,912,352

PROCESS OF IMPROVING THE SURFACE QUALITIES OF CARBOHYDRATE-FREE, HIGH-POLYMER COMPOUNDS, AND PRODUCTS OBTAINED THEREBY

Konrad Höpfner and Ernst Götte, Dusseldorf, Germany, assignors to Dehydag, Deutsche Hydrierwerke G.m.b.H, Dusseldorf, Germany, a corporation of Germany No Drawing. Application April 11, 1955
Serial No. 500,676

9 Claims. (Cl. 117—138.8)

This invention relates to a new and advantageous process of improving the surface qualities of high-polymer compounds and more particularly of carbohydrate-free, high-polymer compounds, and to articles obtained thereby.

It is one object of the present invention to provide a simple and effective process of improving the quality of surfaces of articles made of carbohydrate-free high-polymer plastic materials so as to increase mechanical resistance, resistance to abrasion and scratching, smoothness, electrical insulating quality, antistatic properties, and other properties of said surfaces.

Another object of the present invention is to provide articles made of carbohydrate-free, high-polymer plastic materials, said articles having a surface of improved mechanical resistance and strength properties, increased smoothness, reduced friction, decreased capacity of becoming electrostatically charged or being completely free of static, and of high homogeneity.

Other objects of the present invention and advantageous features thereof will become apparent as the description proceeds.

In principle, the process according to the present invention consists in treating the surface of carbohydrate-free, high-polymer plastic materials or of articles made therefrom with organic electro-neutral salts as they are obtained by reacting equimolecular amounts of anionic surface-active and cationic surface-active compounds.

This process can be represented by the following flow diagram.

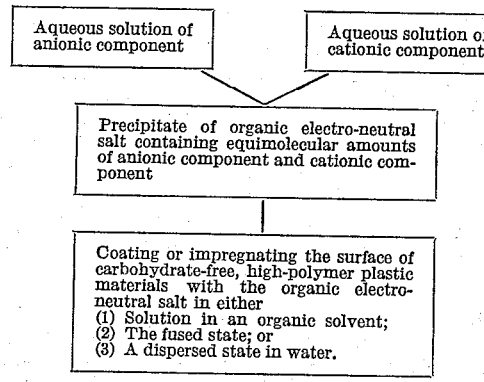

Carbohydrate-free, high polymer plastic materials which are advantageously subject to the process according to the present invention are, more in particular, known polyvinyl compounds, such as polyvinyl chloride, polyvinyl acetate, polyacrylic acid compounds, such as polyacrylonitrile, polyacrylic acid esters, polymethacrylic acid esters, polystyrenes, polyamides, such as the polyamides from hexamethylene diamine and adipic acid, poly-esters, such as phthalic acid glycerides, natural rubber, various types of synthetic rubber, reclaimed rubber, and the like. High-polymers of the carbohydrate-type, such as cellulose derivatives, are excluded from the field of this invention.

Said carbohydrate-free, high-polymer plastic materials can be subjected to the treatment according to the present invention in the form of films, foils, sheets, blocks, or the like, or in the form of processed products made therefrom, or in the form of any other desired molded and shaped articles.

As stated above, treatment of the surface of such articles with organic electro-neutral salts results in improved homogenization of its surface layer. The shear modulus is increased by such a treatment. The capacity of the articles to become electrostatically charged is considerably reduced or static is completely eliminated. The treatment furthermore imparts to the treated surfaces increased mechanical resistance and strength properties.

For producing organic electro-neutral salts for the purpose of the present invention, known cationic surface-active onium compounds are used, such as, for instance, organic ammonium, sulfonium, phosphonium, and the like compounds. Said onium compounds, preferably, contain at least one aliphatic, cycloaliphatic, aliphatic-aromatic, or cycloaliphatic-aromatic residue with at least 6 carbon atoms. Said residue may contain up to 20 and even more carbon atoms. The hydrocarbon radicals of said compounds may also contain hetero atoms, such as oxygen, sulfur, or nitrogen, or groups of hetero atoms derived therefrom, or suitable substituents, such as hydroxyl, mercaptan, amino groups and the like.

The known organic ammonium compounds derived from ammonia or from organic nitrogen bases are of particular practical interest. Such compounds are, for instance, trimethyl octyl ammonium chloride, trimethyl dodecyl ammonium chloride, trimethyl octadecyl ammonium methosulfate, dimethyl dioctadecyl ammonium chloride, dimethyl dodecyl benzyl ammonium chloride, dimethyl cyclohexyl alkyl ammonium chlorides with 10 to 22 carbon atoms in their alkyl radical, or mixtures of such compounds, dodecyl pyridinium chloride, hexadecyl pyridinium bisulfate, and the like.

Anionic surface-active compounds which can be used as the other reaction component in the production of the required organic electro-neutral salts, are, preferably, known compounds of the aliphatic, cycloaliphatic, aliphatic-aromatic, or cycloaliphatic-aromatic series which have in their molecule at least one residue with at least six carbon atoms and up to twenty and even more carbon atoms and at least one acid, salt-forming group, wherein said acid, salt-forming group is neutralized by an inorganic or organic base capable of forming a water soluble salt with said compound. Compounds of this type are, for instance, alkyl sulfates, alkyl sulfonates, alkyl benzene sulfonates, salts of sulfonated oils and fats, salts of dialkyl or dialkyl aryl disulfonic acid imides, or of dialkyl or dialkyl aryl sulfonic carboxylic acid imides, salts of fatty acids or of resin acids, salts of condensation products of higher molecular carboxylic acid halogenides or of higher molecular sulfonic acid halogenides with proteins and the like. The hydrocarbon radicals of said compounds can also be interrupted by hetero atoms, such as oxygen, sulfur, or nitrogen, or by groups of hetero atoms, such as, for instance, ester, carboxylic acid amide, or sulfonic acid amide groups and the like. Said radicals may also contain suitable substituents such as hydroxyl, mercapto, amino groups or the like.

Other anionic surface-active compounds which may be employed as the other reaction component in the production of the required electro-neutral salts are, for instance, water soluble salts of higher molecular fatty acids with at least six carbon atoms, wax acids, naphthenic acids, resin acids, octyloxy acetic acid, hexadecyl mercapto acetic acid, C-alkyl cresoxy acetic acid, the alkyl radical of which contain 3 to 8 carbon atoms, salts of compounds containing inorganic acid groups, such as dodecyl sulfuric acid ester, the sulfuric acid ester mixture of a mixture of aliphatic alcohols obtained by catalytic reduction of coconut oil, oleyl sulfuric acid ester, the sulfuric acid ester of ethylene glycol monooctyl ether, the mono- or disulfuric acid ester of glycerol monostearic acid ester, the phosphoric acid ester of decanediol monocetate, the ω-butyl ether of decyl sulfuric acid ester, the ω-hexyl thioether of octyl thiosulfuric acid ester, N-butyl-N-dodecyl sulfamic acid, the sulfuric acid ester of β-hydroxy-γ-(secondary octyl cresoxy) propane, secondary octyl phenoxy ethane sulfuric acid ester, N-oleoyl-N-methyl amino ethane-β-sulfonic acid, stearoyloxy ethane-β-sulfonic acid, N-cetyl sulfonic sulfanilic acid, the ω-cyclohexyl ether of decane sulfonic acid, secondary octyl phenyl benzyl ether-4′-sulfonic acid, salts of alkyl benzene sulfonic acids the alkyl radicals thereof having between about six and about eighteen carbon atoms, of the mixture of isomeric 2-isoalkyl cresoxy benzoic acid sulfonic acids-5, the alkyl radical thereof having five to eleven carbon atoms, of 1-secondary octyl phenoxy benzene-2,5-disulfonic acid, of 1-secondary hexyl phenoxy-2-(acetyl amino) benzene-4-sulfonic acid, of the sulfonation product of the secondary octyl-1-cresyl benzyl ether, of the sulfonation product of cresoxy acetic acid dodecylamide, and others.

The electro-neutral salts used according to the present invention are prepared from said starting materials, for instance, by mixing equimolecular amounts of an aqueous solution of the anionic surface-active component with an aqueous solution of the cationic surface-active component whereby the electro-neutral salt precipitates. It is understood, of course, that the hydrocarbon radicals of both components may be alike or different from each other. The resulting precipitated products can directly be used for the purpose of this invention or they are first purified, freed from their salt content, and dried. Under certain conditions it is possible to use, in place of said electro-neutral salts, equimolecular amounts of their starting components.

Said organic electro-neutral salts can be employed as such, for instance, in molten form, or in form of their aqueous solutions or dispersions, or in form of their solutions in organic solvents. Aqeous solutions or dispersions are readily obtained by adding an excess of about 5% to about 10% of one of the components of said electro-neutral salt thereto. Satisfactory solubility is also achieved by carefully washing the resulting electro-neutral salts with boiling water. Thereby, inorganic salts formed by the metathesis process of producing the electro-neutral salts and being present therein, are removed and the resulting salt-free electro-neutral salts are capable of swelling in cold water and are colloidally soluble therein.

The organic electro-neutral salts or their solutions or dispersions can be applied to the surface of said carbohydrate-free, high-polymer plastic materials or articles by atomizing, spraying, brushing, or passing through rollers, or the products or articles are dipped or immersed into the molten electro-neutral salts. Rate and speed of absorption of the electro-neutral salts can be improved by the addition of auxiliary solvents, wetting and penetrating agents, and the like. Under suitable conditions the treatment may be carried out at elevated temperature. In most cases adsorption of the electro-neutral salts on the surface is sufficient to produce the desired effects. The electro-neutral salts can be applied to the finished articles as well as to suitable preliminary and intermediate products which, after such an application, are further processed and converted into finished articles.

The following examples serve to illustrate the present invention without, however, limiting the same thereto.

*Example 1*

A film of the polycondensation product made from hexamethylene diamine and adipic acid is continuously passed through an aqueous bath containing from 10 to 15 g. of the organic electro-neutral salt prepared from equimolecular amounts of dimethyl octyl cyclohexyl ammonium chloride and sodium caprinate, said solution containing an excess of 10% of the anionic surface active component. The treated film is freed of adhering solution by squeezing and is dried. The resulting impregnated film can be further worked up in the usual manner to commodity articles and the like. The film has a very smooth surface and is of increased mechanical resistance and strength.

*Example 2*

An organic electro-neutral salt prepared from equimolecular amounts of trimethyl octadecyl ammonium chloride and sodium didodecyl phosphate is applied, in the molten state, by means of heated rollers, to a polyvinyl chloride film intended to be used as floor covering and, thereby is provided with a thin layer of said electro-neutral salt. After cooling, the resulting plastic material surpasses untreated material in its excellent electrical insulating properties.

*Example 3*

Crepe rubber foils to be further processed to shoe soles are treated with a 10% solution of an organic electro-neutral salt prepared from dimethyl octadecyl cyclohexyl ammonium chloride and sodium dialkyl phosphate, the alkyl radicals thereof having 12 to 18 carbon atoms, in carbon tetrachloride or trichloro-ethylene, for instance, by passing sheets of said material through said solution and thereafter allowing the solvent to evaporate. The escaping vapors are recovered. Excellent antistatic properties and increased resistance to abrasion are imparted to said crepe rubber foils by such a treatment.

In a similar manner other organic electro-neutral salts, as they are obtained by reacting equimolecular amounts of cationic surface-active compounds and anionic surface-active compounds such as named hereinbefore, can be applied to the surface of various carbohydrate-free, high-polymer plastic materials and articles made therefrom.

The amounts of organic electro-neutral salts incorporated in this manner into the surface layer of the high-polymer material, of course, vary widely depending upon the process used for applying said salts to the surface and upon the intended use of the treated article. At least amounts of 0.2% of said salts, calculated for the polymer material, are used, and amounts thereof as high as 40% and even more may be employed.

The organic electro-neutral salts may be produced according to any of the methods or compositions described in our co-pending application Serial No. 435,358, filed June 8, 1954.

Various modifications and changes from the specific steps and compositions disclosed herein may be made and various other applications of our invention may be made without departing from the spirit of our invention or the scope of the following claims.

We claim:

1. In a process of improving the surface qualities of non-cellulosic high polymer materials selected from the group consisting of synthetic plastics and natural rubber, the step comprising applying to the surface of said material a water-insoluble organic salt precipitate obtained by adding together an aqueous solution of an organic cationic surface-active onium compound selected from the group consisting of quaternary ammonium compounds, quaternary phosphonium compounds and tertiary sulfonium compounds and having at least one aliphatic hydrocarbon radical containing 6 to 22 carbon atoms and an aqueous solution of an organic anionic surface-active compound having at least one aliphatic hydrocarbon radical containing 6 to 20 carbon atoms and at least one acid radical capable of being neutralized by an organic base to form a salt therewith selected from the group consisting of sulfuric acid radicals, sulfonic acid radicals, phosphoric acid radicals and carboxylic acid radicals, said cationic and said anionic compounds being in substantially equimolar proportions in said precipitate.

2. In a process of improving the surface qualities of non-cellulosic high polymer materials selected from the group consisting of synthetic plastics and natural rubber, the step comprising applying to the surface of articles made from said material a water-insoluble organic salt precipitate obtained by adding together an aqueous solution of an organic cationic surface-active onium compound selected from the group consisting of quaternary ammonium compounds, quaternary phosphonium compounds and tertiary sulfonium compounds and having at least one aliphatic hydrocarbon radical containing 6 to 22 carbon atoms and an aqueous solution of an organic anionic surface-active compound having at least one aliphatic hydrocarbon radical containing 6 to 20 carbon atoms and at least one acid radical capable of being neutralized by an organic base to form a salt therewith selected from the group consisting of sulfuric acid radicals, sulfonic acid radicals, phosphoric acid radicals and carboxylic acid radicals, said cationic and said anionic compounds being in substantially equimolar proportions in said precipitate.

3. In a process of improving the surface qualities of rubber in shaped form, the steps which comprise passing said shaped rubber through a solution of a water-insoluble organic salt precipitate obtained by adding together an aqueous solution of an organic cationic surface-active onium compound selected from the group consisting of quaternary ammonium compounds, quaternary phosphonium compounds and tertiary sulfonium compounds and having at least one aliphatic hydrocarbon radical containing 6 to 22 carbon atoms and an aqueous solution of an organic anionic surface-active compound having at least one aliphatic hydrocarbon radical containing 6 to 20 carbon atoms and at least one acid radical capable of being neutralized by an organic base to form a salt therewith selected from the group consisting of sulfuric acid radicals, sulfonic acid radicals, phosphoric acid radicals and carboxylic acid radicals, said cationic and said anionic compounds being in substantially equimolar proportions in said precipitate, in an organic solvent and evaporating the solvent.

4. In a process of improving the surface qualities of polyvinyl chloride sheet material, the step comprising rolling a molten water-insoluble organic salt precipitate obtained by adding together an aqueous solution of an organic cationic surface-active onium compound selected from the group consisting of quaternary ammonium compounds, quaternary phosphonium compounds and tertiary sulfonium compounds and having at least one aliphatic hydrocarbon radical containing 6 to 22 carbon atoms and an aqueous solution of an organic anionic surface-active compound having at least one aliphatic hydrocarbon radical containing 6 to 20 carbon atoms and at least one acid radical capable of being neutralized by an organic base to form a salt therewith selected from the group consisting of sulfuric acid radicals, sulfonic acid radicals, phosphoric acid radicals and carboxylic acid radicals, said cationic and said anionic compounds being in substantially equimolar proportions in said precipitate, at elevated temperature upon said sheet material, thereby providing the surface of said sheet material with a thin layer of said electro-neutral salt.

5. In a process of improving the surface qualities of a film of a hexamethylene diamine-adipic acid polycondensation product, the steps comprising continuously passing said film through an aqueous bath containing a water-insoluble organic salt precipitate obtained by adding together an aqueous solution of an organic cationic surface-active onium compound selected from the group consisting of quaternary ammonium compounds, quaternary phosphonium compounds and tertiary sulfonium compounds and having at least one aliphatic hydrocarbon radical containing 6 to 22 carbon atoms and an aqueous solution of an organic anionic surface-active compound having at least one aliphatic hydrocarbon radical containing 6 to 20 carbon atoms and at least one acid radical capable of being neutralized by an organic base to form a salt therewith selected from the group consisting of sulfuric acid radicals, sulfonic acid radicals, phosphoric acid radicals and carboxylic acid radicals, said cationic and said anionic compounds being in substantially equimolar proportions in said precipitate, and removing the water from the thus treated film.

6. Non-cellulosic high polymer materials selected from the group consisting of synthetic plastics and natural rubber, the surface of said material having applied thereto a water-insoluble organic salt precipitate obtained by adding together an aqueous solution of an organic cationic surface-active onium compound selected from the group consisting of quaternary ammonium compounds, quaternary phosphonium compounds and tertiary sulfonium compounds and having at least one aliphatic hydrocarbon radical containing 6 to 22 carbon atoms and an aqueous solution of an organic anionic surface-active compound having at least one aliphatic hydrocarbon radical containing 6 to 20 carbon atoms and at least one acid radical capable of being neutralized by an organic base to form a salt therewith selected from the group consisting of sulfuric acid radicals, sulfonic acid radicals, phosphoric acid radicals and carboxylic acid radicals, said cationic and said anionic compounds being in substantially equimolar proportions in said precipitate.

7. Rubber article of improved surface qualities, the surface of said rubber article being impregnated with a water-insoluble organic salt precipitate formed by adding together an aqueous solution of a cationic tri-alkyl-cyclohexyl-ammonium halide wherein one of said alkyl radicals contains 20 to 22 carbon atoms, and an aqueous solution of an anionic alkali metal salt of a di-alkyl phosphate with 12 to 18 carbon atoms in the alkyl radicals, said cationic and said anionic compounds being in substantially equimolar proportions in said precipitate.

8. A polyvinyl chloride sheet material of improved surface qualities, the surface of said sheet material being provided with a thin layer of a water-insoluble organic salt precipitate formed by adding together an aqueous solution of cationic trimethyl-octadecyl-ammonium chloride and an aqueous solution of anionic sodium didodecyl phosphate, said cationic and said anionic compounds being in substantially equimolar proportions in said precipitate.

9. A film of a hexamethylene diamine-adipic acid polycondensation product of improved surface qualities, the surface of said film being impregnated with a water-insoluble organic salt precipitate obtained by adding together an aqueous solution of cationic dimethyl-octyl-cyclohexyl-ammonium chloride and an aqueous solution of an anionic alkali metal salt of a higher fatty acid, said cationic and said anionic compounds being in substantially equimolar proportions in said precipitate.

References Cited in the file of this patent

UNITED STATES PATENTS

| | | |
|---|---|---|
| 1,965,139 | Fentress | July 3, 1934 |
| 2,032,097 | Piggott | Feb. 25, 1936 |
| 2,189,664 | Katzman | Feb. 6, 1940 |
| 2,313,154 | Kelly et al. | Mar. 9, 1943 |
| 2,373,173 | Dean | Apr. 10, 1945 |
| 2,386,936 | De Groote | Oct. 16, 1945 |
| 2,517,093 | De Groote | Aug. 1, 1950 |
| 2,597,708 | Cresswell | May 20, 1952 |
| 2,626,877 | Carnes | Jan. 27, 1953 |
| 2,676,122 | McCarthy | Apr. 20, 1954 |

UNITED STATES PATENT OFFICE

CERTIFICATE OF CORRECTION

Patent No. 2,912,352                          November 10, 1959

Konrad Höpfner et al.

It is hereby certified that error appears in the printed specification of the above numbered patent requiring correction and that the said Letters Patent should read as corrected below.

Column 6, line 39, for "20 to 22" read -- 10 to 22 --.

Signed and sealed this 9th day of August 1960.

(SEAL)
Attest:
KARL H. AXLINE
Attesting Officer

ROBERT C. WATSON
Commissioner of Patents